United States Patent [19]

Ort

[11] 3,956,255

[45] May 11, 1976

[54] CATALYST FOR THE POLYMERIZATION OF OLEFINS

[75] Inventor: Morris R. Ort, Wilbraham, Mass.

[73] Assignee: Monsanto Company, St. Louis, Mo.

[22] Filed: June 5, 1974

[21] Appl. No.: 476,746

Related U.S. Application Data

[63] Continuation-in-part of Ser. No. 429,986, Jan. 2, 1974, abandoned.

[52] U.S. Cl. ............................ 526/352; 252/429 B; 252/429 C; 252/431 R; 526/129; 526/151
[51] Int. Cl.$^2$ ...................... C08F 4/02; C08F 10/02
[58] Field of Search ......... 260/94.9 DA; 252/429 B, 252/429 C, 431 R

[56] References Cited

UNITED STATES PATENTS

| | | | |
|---|---|---|---|
| 2,898,328 | 8/1959 | Reed et al. | 260/94.9 C |
| 2,981,725 | 4/1961 | Luft et al. | 260/94.9 DA |
| 3,642,748 | 2/1972 | Iwasaki et al. | 260/94.9 DA |
| 3,718,635 | 2/1973 | Tomoshige et al. | 260/94.9 DA |
| 3,784,539 | 1/1974 | Ort | 260/94.9 E |
| 3,787,384 | 1/1974 | Stevens et al. | 260/94.9 DA |

FOREIGN PATENTS OR APPLICATIONS

| | | | |
|---|---|---|---|
| 1,059,865 | 2/1967 | United Kingdom | 260/94.9 C |
| 2,015,592 | 12/1970 | Germany | 260/94.9 DA |

*Primary Examiner*—Edward J. Smith
*Attorney, Agent, or Firm*—Elizabeth F. Sporar

[57] ABSTRACT

A supported catalyst for the polymerization and copolymerization of ethylene in the presence of hydrogen as a molecular weight control agent is prepared by depositing upon silica gel which has been reacted with an alkylaluminum or an alkylaluminum alkoxide, a catalytic composition consisting essentially of a compound of vanadium, a trialkylaluminum and an alkylaluminum alkoxide, said catalytic composition having been prepared by combining said vanadium compound with said alkylaluminum alkoxide and thereafter combining the reaction mixture with said trialkylaluminum. The supported catalyst so prepared exhibits greater activity than does the same catalyst composition supported on untreated silica gel.

10 Claims, No Drawings

CATALYST FOR THE POLYMERIZATION OF OLEFINS

BACKGROUND OF THE INVENTION

This application is a continuation-in-part of application Ser. No. 429,986 filed Jan. 2, 1974, now abandoned.

The present invention relates to improved catalysts for the polymerization of olefins such as ethylene and, more particularly, to supported catalysts of the Ziegler-type for use in the polymerization of olefins whereby polymers with particularly desirable properties are obtained in high yields.

It has been well known for some time now that ethylene and other olefins can be polymerized alone to produce homopolymers or in combinations to produce interpolymers or copolymers at relatively low pressures and temperatures by using so-called Ziegler catalysts. Ziegler catalysts may be described broadly as consisting of various combinations of strong reducing agents such as organometallic compounds of an alkali metal, alkaline earth metal, zinc, earth metal or a rare earth metal with various reducible heavy metal compounds such as the halides, alkoxides, acetylacetonates, etc., of the metals of Groups IV-B, V-B, VI-B, VII-B and VIII of the periodic system. Among the preferred types of catalyst for this reaction are those consisting of a vanadium compound and an organoaluminum compound such as an aluminum alkyl or an alkylaluminum halide as an activator. Particularly preferred are catalysts containing vanadium oxychloride with an alkylaluminum compound such as triethylaluminum, ethylaluminum dichloride, diethylaluminum chloride and the like. With these catalysts, very small amounts of the vanadium compound are employed to provide high yields of polymer per unit of catalyst which can be processed without further purification or chemical treatment after recovery from the reaction mixture by simple separation techniques such as filtering, centrifuging, evaporating or purging.

Generally, the polymers produced with the foregoing catalysts are of high density, that is, 0.95 and above. The molecular weights of the polymers so produced fall within a wide range. Polymers having molecular weights from 2,000 to 300,000 and as high as 3,000,000 or more can be produced. control of molecular weight can be effected to some extent by controlling process variables but in view of the general interdependence of process variables such control is usually effected by addition of various amounts of modifying agents such as hydrogen as described, for example, in U.S. Pat. No. 3,501,690. When hydrogen is employed, however, in the large quantities which are sometimes required to obtain the desired molecular-weight control, say in amounts in excess of 50% by volume, the polymerization reaction rate drops off, resulting in a decrease in productivity per unit time. Moreover, only a certain degree of control can be effected with hydrogen when employing the described catalyst systems, there being an upper limit, depending upon the particular catalyst system, beyond which any further addition of hydrogen has little additional effect.

A means of overcoming the drawbacks or disadvantages discussed above with a vanadium-containing catalyst has been described and claimed in U.S. Pat. No. 3,784,539 which is incorporated herein by reference. Catalysts have been described therein which enhance the ability of hydrogen to act as a chain-transfer agent in controlling the molecular weight of the olefin polymer. The catalysts prepared in the claimed manner may be used either in unsupported form or supported on a suitable material, the supported catalysts being particularly suitable in gas-phase polymerization. We have now discovered that substantial increases in yield may be obtained with such catalysts supported on a particular material, namely, silica gel treated with an alkylaluminum compound, without any deterioration in the desirable physical properties of the polymers obtained.

SUMMARY OF THE INVENTION

According to the invention, a superior catalyst composition for the polymerization and copolymerization of ethylene in the presence of hydrogen as a molecular weight control agent is obtained by depositing upon silica gel which has been reacted with an alkylaluminum or an alkylaluminum alkoxide or mixtures thereof, a composition consisting essentially of a compound of vanadium, a trialkylaluminum and an alkylaluminum alkoxide of the formula $R_nAl(OR)_{3-n}$ wherein R is a hydrocarbyl group containing from about 1 to about 12 carbon atoms and $n$ varies from 0.5 to 2.0 inclusive and mixtures of such compounds, said composition having been prepared by combining said vanadium compound with said aluminum alkoxide and thereafter combining the reaction mixture with said trialkylaluminum. The resulting supporting catalyst exhibits greater activity in the polymerization or copolymerization of ethylene than does the same catalyst supported on untreated silica gel.

DESCRIPTION OF THE PREFERRED EMBODIMENTS

The invention is illustrated in the following examples which, however, are not to be construed as limiting it in any manner whatsoever. Unless otherwise specified, all parts given are parts by weight.

EXAMPLE 1

A series of polymerizations of ethylene in the vapor phase in which hydrogen was employed as a molecular weight control agent was conducted in a bench-scale unit to demonstrate the effect of using untreated silica gel and silica gel treated by reacting it with an alkylaluminum or an alkylaluminum alkoxide as supports for a vanadium oxychloride-alkylaluminum-alkylaluminum alkoxide catalyst.

A quantity of silica gel (MS ID Grade 952 available from Davison Chemical Division, W. R. Grace and Company, Industrial Chemicals Department, Baltimore, Md.) having an average particle size of approximately 50–65$\mu$ (230 to 270 mesh size U.S. Standard Screen Series) was dehydrated in a fluid bed over a period of about 12 hours at 200°C using dry nitrogen as the fluidizing gas. The dried silica contained on the surface about 1.4 mmol of available hydroxyl groups per gram as determined by reaction with triethylaluminum. Approximately a 24-g portion of the dehydrated gel was charged to a small fluid-bed catalyst preparation unit and fluidized with dry oxygen-free nitrogen at a temperature of about 40°C while a 2M solution of triethylaluminum (TEA) in hexane was added dropwise onto the silica gel. The amount of TEA used was equivalent to one millimole per gram of silica gel. After the TEA addition was complete, the hexane was evaporated from the fluid bed. In like manner, two other 24-g portions of the dehydrated silica gel were treated with diethylaluminum ethoxide (DEAE) and the ethylaluminum diethoxide (EADE), respectively.

Polymerization catalysts were prepared using the three treated silica gel samples and one untreated sample of the dehydrated silica gel as supports. To a stirred, nitrogen-blanketed glass vessel, there was charged in the order named 100 ml of hexane and the required amounts of 2M solutions in hexane of pure $VOCl_3$, EADE or ethylaluminum sesquiethoxide (EASE) and TEA to provide the predetermined molar ratio of each component. The mixture was stirred for 10 minutes after which it was fed dropwise into a catalyst preparation unit wherein the catalyst support was fluidized by dry nitrogen. The catalyst solution was thus deposited upon the support, fluidization being continued until all the hexane was evaporated and the catalyst was dry.

Each of the catalysts was then tested in a series of polymerizations of ethylene. The catalyst was charged to the polymerization reactor of a bench-scale unit comprising said reactor, a heat exchanger and the necessary accessory equipment. The jacketed reactor was of cylindrical configuration and of such size as to contain a fluidized bed of catalyst and product particles approximately 4-in. in diameter and 2.5 to 3-ft. in depth. At the top of the bed section, the reactor expanded in the form of an inverted cone into a disengaging section of larger diameter where any entrained particles in the unreacted gas were separated and fell back into the bed. The unreacted or recycle gas was continuously withdrawn from the top of the disengaging zone, passed through a heat exchanger to maintain a predetermined temperature and introduced at the bottom of the reactor at a rate sufficient to maintain the particles in the bed in a highly fluidized state. Make-up ethylene and hydrogen were introduced into the recycle gas line while fresh catalyst particles were fed into the reactor below the top of the bed. The polymer product was withdrawn at the bottom of the bed.

Additional TEA was added during the polymerization at a rate of about 2 to 3 mmol of TEA per hour. In some runs, a halogenated alkane was introduced into the reactor along with the ethylene in a separate metered stream to provide an amount of the halogenated alkane equal to about 100 mmol per mmol of vanadium per hour. Reactor pressure was about 500 psig. Product polyethylene was continuously withdrawn at a rate of about one pph, as described above, to maintain a constant bed level.

Samples of the polymers made were evaluated with respect to their physical properties. The following methods were employed in determining the polymer properties. Melt index ($I_2$) was determined by ASTM Test D-1238-65T using a 2,160-gram weight. Melt extrusion rate ($I_{10}$) was determined using the same method employed for determination of melt index except the weight on the sample was 10 kg. ASTM Test D-1895 A-67 was employed for determining bulk density. Results of these tests presented in Table 1 together with polymerization conditions show that pretreatment of the silica gel support with an alkylaluminum provides higher yields of polyethylene at comparable polymerization conditions than are obtained with the untreated silica gel as support without any adverse effects on the polymer properties.

TABLE I

| Silica Modifier | Catalyst Composition | | | | | | | | Polymer Properties | | |
|---|---|---|---|---|---|---|---|---|---|---|---|
| Silica Gel Modifier | $VOCl_3$ mmol | Alkoxide | TEA mmol | mmol | Temp. °C | Halogenated Alkane | $H_2$ % | Yield KgPE/g V | $I_2$ | $I_{10}/I_2$ | Bulk Density lb/ft³ |
| None | 2 | EASE | 12 | 6 | 105 | None | 5.3 | 25 | 1.4 | 11.3 | 23.5 |
| DEAE | 2 | " | 12 | 6 | 106 | None | 4.9 | 33 | 1.4 | 10.6 | 23.1 |
| None | 1 | " | 6 | 3 | 90 | $CCl_3F$ | 5.9 | 218 | .41 | 11.3 | 19.6 |
| TEA | 1 | " | 6 | 3 | 89 | $CCl_3F$ | 6.1 | 274 | .48 | 11.5 | 21.7 |
| DEAE | 1 | " | 6 | 3 | 90 | $CCl_3F$ | 6.4 | 501 | .41 | 12.1 | 20.8 |
| EADE | 1 | " | 6 | 3 | 89 | $CCl_3F$ | 6.0 | 235 | .51 | 11.0 | 21.3 |
| None | 1 | EADE | 12 | 12 | 105 | $CHCl_3$ | 8.0 | 19 | 6.6 | 9.6 | 25.2 |
| TEA | 1 | " | 12 | 12 | 105 | $CHCl_3$ | 7.2 | 124 | 7.5 | 9.4 | 27.3 |
| DEAE | 1 | " | 12 | 12 | 107 | $CHCl_3$ | 5.5 | 325 | 6.6 | 9.0 | 26.3 |
| EADE | 1 | " | 12 | 12 | 107 | $CHCl_3$ | 5.3 | 386 | 8.3 | 8.6 | 25.5 |

EXAMPLE 2

A series of polymerizations of ethylene similar to those in Example 1 except that polymerization was carried out in the slurry phase was conducted using treated and untreated silica gel as the catalyst support.

A polymerization catalyst (1) was prepared by suspending 5 g of anhydrous silica gel in 25 ml of hexane in a dry nitrogen-purged flask equipped with a magnetic stirrer. To the suspension was added an amount of EADE equivalent to 0.8 mmol per gram of silica gel (4.0 mmol) and the resulting mixture stirred at room temperature for at least 30 minutes. In a separate nitrogen-purged bottle containing 5.0 ml of dry hexane, 8 mmol of EADE and 4 mmol of $VOCl_3$ were stirred together for 5 minutes and then 8 mmol of TEA were added and the whole mixture stirred together at room temperature for 30 minutes. This mixture was added to the silica gel mixture with stirring. After an hour or so the hexane layer became perfectly clear indicating complete adsorption of the catalyst on the silica gel.

Polymerization catalyst (2) was prepared in exactly the same way as catalyst (1) except that the silica gel was not first reacted or treated with EADE.

The two catalysts prepared as described above were used to polymerize ethylene in a hexane medium. The polymerizations were conducted in a closed system using a stirred 2.5-liter stainless-steel reactor. The reactor was conditioned by cleaning, purging with hot nitrogen until dry and essentially oxygen-free and charging with hexane. The system was flushed with ethylene at atmospheric pressure and the catalyst suspension was introduced into the reactor. All ethylene introduced into the reactor was first passed through activated carbon and molecular sieve columns for drying and removal of trace impurities. Hydrogen was then introduced up to a pressure of about 17.5 psig (5% concentration overall). Ethylene to be polymerized was fed into the reactor from a volume-calibrated, oxygen-free, high-pressure cylinder equilibrated at indoor laboratory conditions through an electric solenoid valve, until the final reaction pressure of 350 psig was attained. The total amount of ethylene introduced was determined by calculation using measurements of the upstream pressure before and after polymerization made by means of an electronic transducer. During the polymerization period of about 2 hours under constant stirring, temperature was maintained at about 85°C and small amounts of a solution of TEA (1M) in hexane were injected into the reactor to maintain the rate of reaction which tends to decay with time. At the end of the reaction period the contents of the reactor were allowed to cool. The unreacted ethylene was vented and replaced by dry nitrogen. The reaction slurry was discharged into a receiving vessel and thereafter filtered in a large Buchner funnel. A solution of a phenolic antioxidant was thoroughly admixed with the polymer after which it was dried in a vacuum oven overnight. Physical properties of the polymer were determined using samples of the dried stabilized material. Results presented in Table 2 confirm those obtained in the gas-phase polymerizations of Example 1. Yields obtained with the catalyst supported on silica gel treated with EADE are significantly higher than those obtained with the catalyst supported on untreated silica gel at comparable polymerization conditions, the polymer in both cases having similar physical properties. Also notable is the fact that the catalyst supported on treated silica gel provides polymer having a higher bulk density than the polymer made with the catalyst on untreated silica gel.

reaction therewith. Agitation or stirring is required for good contact and mixing. Contact time should be from about 2 to 60 minutes or longer to ensure reaction. The solvent need not be removed if the catalyst is to be used for slurry-phase polymerization but can be removed by conventional techniques such as filtration, centrifuging, evaporation, blowing with nitrogen, etc., to provide a dry catalyst useful for gas-phase polymerization. Preferably, the treatment step is effected under an inert atmosphere.

Alkylaluminum compounds suitable for treating the silica gel are (1) compounds of the formula $R_nAlX_{3-n}$ where R is an alkyl radical having from 1 to 12 carbon atoms, X is a halogen and $n$ is 1, 2 or 3 and mixtures thereof and (2) compounds of the formula $R_nAl(OR)_{3-n}$ wherein R is an alkyl group having 1 to 12 carbon atoms and $n$ is 1, 2 or 3 and mixtures thereof.

Specific examples of suitable compounds of formula (1) are triethylaluminum, tributylaluminum, triisobutylaluminum, tripropylaluminum, triphenylaluminum, trioctylaluminum, tridodecylaluminum, dimethylaluminum chloride, diethylaluminum chloride, dipropylaluminum fluoride, diisobutylaluminum chloride, ethylaluminum dichloride, and the like. Mixtures of the foregoing types of aluminum compounds can also be employed. The total reaction mixtures obtained in the formation of such compounds, i.e., by treatment of metallic aluminum with alkyl halides resulting in the formation of such mixtures as dialkylaluminum halides plus monoalkylaluminum dihalides, termed alkylalumi-

TABLE 2

| Catalyst Prep. | Catalyst Composition | | | Halogenated Alkane | Yield KgPE/g V | Polymer Properties | | |
|---|---|---|---|---|---|---|---|---|
| | $VOCl_3$ (mmol) | EADE (mmol) | TEA (mmol) | | | $I_2$ | $I_{10}/I_2$ | Bulk Density lb/ft³ |
| 1 | 4 | 8 | 8 | None | 132.2 | 0.14 | 10.9 | 14.2 |
| 1 | 4 | 8 | 8 | None | 118.1 | 0.3 | 10.6 | 15.7 |
| 1 | 4 | 8 | 8 | None | 123.9 | 0.17 | 10.5 | 12.8 |
| 1 | 4 | 8 | 8 | $CHCl_3$ | 396 | 0.18 | 10.6 | 11.0 |
| 2 | 4 | 12 | 8 | None | 51.2 | 0.2 | 10.9 | 7.0 |
| 2 | 4 | 12 | 8 | None | 93.0 | 0.2 | 10.0 | 9.3 |
| 2 | 4 | 12 | 8 | None | 81.7 | 0.17 | 8.2 | 7.1 |
| 2* | 4 | 12 | 8 | None | 98.0 | 2.1 | 11.0 | 11.0 |
| 2 | 4 | 12 | 8 | $CHCl_3$ | 221.6 | 0.15 | 10.0 | 7.8 |

*10% Hydrogen

Treatment of the silica gel catalyst support to obtain the yield advantages shown in the examples is effected in a relatively simple manner since the only requirement is that physically adsorbed water be removed. The silica gel may be dried at a temperature of approximately 150° to 260°C for a period of at least 4 hours and preferably from about 6 to about 12 hours at atmospheric pressure. The drying step is expediently carried out by passing hot nitrogen through a fluidized or fixed bed of silica gel. Alternatively, the silica gel may be dried at a temperature of approximately 100° to 200°C under vacuum for the same time periods but without a nitrogen purge. After drying is complete, a solution of an alkylaluminum compound in a solvent such as hexane can be charged slowly onto the silica gel while it is being mixed either by fluidizing gas or by mechanical means. Ambient temperatures from 25° to 50°C are generally suitable depending upon the solvent employed which is evaporated as reaction with the alkylaluminum compound takes place although temperatures up to 80°C or higher may be used. Alternatively, the dried silica gel may be suspended in a suitable solvent such as hexane, for example, and the alkylaluminum compound added to the suspension or slurry for num sesquihalides, are also suitable. The compounds preferred for use as treating agents are the non-halogenated ones because with these there is no problem of halogen residues in the polymer. Especially preferred among the non-halogenated compounds is triethylaluminum. Specific examples of suitable compounds of formula (2) are ethylaluminum diethoxide, diethylaluminum ethoxide, ethylaluminum isopropoxide, ethylaluminum sesquiethoxide, and the like. Preferred is diethylaluminum ethoxide.

The amount of alkylaluminum compound employed depends upon the amount of available hydroxyl groups on the surface of the silica gel. This amount can be determined by reacting the support material with excess TEA, for example, and determining the amount of evolved ethane. The actual amount of organoaluminum compound used for treating the silica gel varies from about 0.3 to 1.0 mole of aluminum compound per mole of available hydroxyl groups as determined by the above method. The preferred amount of organoaluminum compound is in the range from about 0.50 to about 0.75 mole per mole of available hydroxyl groups.

The particle size of the silica gel employed as catalyst support is not critical. However, in gas-phase polymerization, the particle size employed depends upon the desired particle size of the polymer being produced since it has been established as disclosed and claimed in copending application Ser. No. 341,837 filed Mar. 16, 1973 that the product particle size can be controlled by using a catalyst support material having a particular range of particle size. Generally, for efficient operation the catalyst support will have an average particle size in the range from about 30 to about 600$\mu$ depending upon the melt index of the polymer being produced. The higher melt index polymer ($\sim$ 5 and up) requires a support having a larger average particle size while the lower melt index product ($\sim$ 1 and lower) requires a smaller particle size.

The catalysts which are supported on the treated silica gel are the vanadium-containing Ziegler-type catalysts described and claimed in U.S. Pat. No. 3,784,539 which is incorporated herein by reference. These consist of a compound of vanadium which is preferably a vanadium halide but may be an alkoxide, an organic salt, or complex of this metal, a trialkylaluminum and an alkylaluminum alkoxide. The vanadium in the compounds employed should be in a valence form higher than the lowest possible valence and preferably should be in a valence state of 3 and above. The tetrahalides, trihalides and mixtures of the di-, tri- and tetrahalides, etc., can be used. Especially preferred is vanadium oxytrichloride. Vanadium compounds other than the halides which can be employed include vanadium triacetylacetonate, vanadium oxydiacetylacetonate, vanadium naphthenate, vanadium benzoate, or vanadium esters such as $VO(OC_4H_9$-$i)_3$, $VO(OC_3H_7$-$i)_3$, $VO(OC_2H_5)Cl_2$, $VO(OC_2H_5)_2Cl$ and the like.

The trialkylaluminum compounds in addition to the TEA shown in the examples include tributylaluminum, trimethylaluminum, triisobutylaluminum, tripropylaluminum, trioctylaluminum, tridodecylaluminum and the like.

The aluminum alkoxide used in the catalyst composition is a compound of the formula $R_nAl(OR)_{3-n}$, wherein the R is a hydrocarbyl group containing from about 1 to about 12 carbon atoms and $n$ varies from 0.5 to 2.0 and preferably from 1 to 1.5 inclusive. The hydrocarbyl group can be any selected hydrocarbon group such as alkyl, aryl, alkaryl, aralkyl, alicyclic, bicyclic and the like. Suitable groups include methyl, ethyl, propyl, isopropyl, n-butyl, isobutyl, n-pentyl, isopentyl, t-pentyl, hexyl, cyclohexyl, 2-methylpentyl, heptyl, octyl, 2-ethylhexyl, cyclohexylmethyl, nonyl, decyl, dodecyl, benzyl, pinyl, pinylmethyl, phenethyl, p-methylbenzyl, phenyl, tolyl, xylyl, naphthyl, ethylphenyl, methylnaphthyl, or any such similar hydrocarbon groups. Preferably, those R groups directly bonded to the aluminum atom are alkyl groups containing from 1 to 8 carbon atoms and they can be the same or different. The methods for preparation of the alkylaluminum alkoxides are thoroughly described in U.S Pat. No. 3,784,539.

The active ingredients of the catalyst in the prescribed order are deposited upon the treated silica gel or the catalyst is prepared as a solution or slurry and admixed thoroughly with the support while the latter is maintained in a blending state in suitable equipment. The solvent or carrier liquid is evaporated and the catalyst dried on the support. Deposition can be effected either at atmospheric pressure, at elevated pressures or at reduced pressures. Alternatively, the catalyst solution or suspension may be prepared by combining the vanadium-containing compound and the alkoxide and then adding the alkylaluminum in a suitable reaction medium. The resulting mixture is then admixed thoroughly with the treated silica gel and the resulting slurry is charged to the reactor.

The quantities of the components of the catalytic system of the invention can be varied. In general, the mole ratio of reducing agent to transition metal compound can be in the range from 0.3:1 to 500:1, on up to 1000:1 or even higher. The preferred Al:V ratio of organoaluminum compound to vanadium compound lies between 1:1 and 500:1. The alkoxide-to-vanadium ratio may likewise vary from about 1:10 to about 100:1. For most effective operation, ratios from about 1:2 to about 50:1 are employed.

The improved catalysts described and claimed herein are broadly applicable for use in the preparation of any solid polymers ordinarily prepared by using Ziegler-type catalysts. It is particularly suited for use with polymers prepared by polymerizing ethylenically unsaturated hydrocarbons or olefins such as ethylene as illustrated in the examples, propylene, butene-1, heptene-1, octadecene-1, dodecene-1, 3-methylbutene, 4-methylbutene-1, styrene, vinyl cyclohexene and the like either alone, with each other, or with other monomers, especially diolefins such as butadiene, isoprene, piperylene, cyclopentadiene, 1,4-pentadiene and the like.

The amount of catalyst required is comparatively small. Generally, amounts from 0.01 to 5.0% by weight based on the total weight of monomer charged are satisfactory although amounts as small as 0.001% are sometimes permissible and larger amounts up to, say 20% can be employed.

The polymerization reaction can be conducted over a wide range of temperatures from 0° to 120°C and higher if desired. Preferably, reaction temperature is maintained at about 65° to 115°C. Likewise, while atmospheric and subatmospheric pressures can be used, superatmospheric pressures are preferred. The applicability of the present catalyst is not limited to any catalyst suspending medium or particular conditions of temperature and pressure under which the polymerization reaction itself is carried out although a gas-phase reaction is preferred.

Generally, when the vanadium-containing catalysts of the present invention are employed for polymerizing olefins, only small amounts of catalyst are required and catalyst residues in the polymer are at such a low level as to be insignificant and non-interfering in subsequent processing of the polymer. Quenching is not usually required when the polymerization is conducted in the gas phase. However, in some instances when the slurry-phase technique is used, it may be necessary or desirable to inactivate the catalyst and remove the catalyst residues from the polymer. Any alkyl alcohol containing from 2 to 8 carbon atoms can be employed for quenching or destruction of the catalyst after the polymerization is complete and before separation of the polymer from the reaction mixture. Of the suitable alcohols which include ethyl alcohol, propyl alcohol, isobutyl alcohol, amyl alcohol, hexyl alcohol, octyl alcohol, and the like, isopropyl and tert-butyl alcohols are the preferred quenching agents. The amount of alcohol used for quenching is critical only in the sense that it must be sufficient to destroy completely all catalyst activity and may be varied widely from about 0.001% to about 300% of the weight of the reaction mixture of polyolefin slurry being treated. The optimum amount for use will vary according to the quantity of catalyst present in the polymerizate. Generally, amounts from those about equivalent to the total number of aluminum-carbon bonds in the catalyst components up to about 25% by weight of the polymer slurry are satisfactory, but the amount can be controlled as desired to provide enough of alcohol to form a slurry of satisfactory fluidity while remaining which the bounds of economical operations. The quenching operation and recovery of the polymer may be carried out according to well known conventional procedures.

What is claimed is:

1. An improved catalyst for the polymerization and copolymerization of ethylene in the presence of hydrogen as a molecular weight control agent consisting essentially of (1) a composition prepared by combining a compound of vanadium with an alkylaluminum alkoxide of the formula $R_nAl(OR)_{3-n}$ wherein R is a hydrocarbyl group containing from 1 to 12 carbon atoms and n varies from 0.5 to 2 inclusive and mixtures of such compounds, and thereafter combining the resulting reaction mixture with a trialkylaluminum, the molar ratio of said trialkylaluminum to said compound of vanadium being in the range from 0.3:1 to 1000:1 and said alkoxide-to-vanadium molar ratio being in the range from 1:10 to about 100:1, and (2) a support on which said composition is deposited consisting of silica gel which has been reacted with an alkylaluminum compound chosen from the group consisting of (1) $R_nAlX_{3-n}$ wherein R is an alkyl radical having from 1 to 12 carbon atoms, X is a halogen and $n$ is 1, 2 or 3 and mixtures thereof and (2) compounds of the formula $R_nAl(OR)_{3-n}$ wherein R is an alkyl radical having from 1 to 12 carbon atoms and $n$ is 1 or 2 and mixtures thereof.

2. The catalyst of claim 1 wherein said silica gel has been reacted with a trialkylaluminum.

3. The catalyst of claim 2 wherein said trialkylaluminum is triethylaluminum.

4. The catalyst of claim 1 wherein said silica gel has been reacted with diethylaluminum ethoxide.

5. The catalyst of claim 1 wherein said silica gel has been reacted with ethylaluminum diethoxide.

6. The catalyst of claim 4 wherein said vanadium compound in said catalytic composition is vanadium oxytrichloride.

7. The catalyst of claim 6 wherein said trialkylaluminum in said catalytic composition is triethylaluminum.

8. The catalyst of claim 7 wherein said alkylaluminum alkoxide in said catalytic composition is ethylaluminum sesquiethoxide.

9. A process for producing ethylene polymers which comprises contacting ethylene in the presence of hydrogen and under polymerization conditions with a catalytic amount of a catalyst prepared by reacting vanadium oxytrichloride with ethylaluminum sesquiethoxide, thereafter combining the resulting reaction mixture with triethylaluminum, the molar ratio of said triethylaluminum to vanadium oxytrichloride being in the range from 0.3:1 to 1000:1 and the alkoxide-to-vanadium molar ratio being in the range from 1:10 to about 100:1, and depositing the resulting mixture on silica gel which has been reached ith diethylaluminum ethoxide.

10. The process of claim 9 wherein a haloalkane is present during the polymerization.

* * * * *

UNITED STATES PATENT OFFICE
CERTIFICATE OF CORRECTION

Patent No. 3,956,255  Dated May 11, 1976

Inventor(s) Morris R. Ort

It is certified that error appears in the above-identified patent and that said Letters Patent are hereby corrected as shown below:

The term of this patent subsequent to January 8, 1990, has been disclaimed.

Signed and Sealed this

Thirteenth Day of July 1976

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,956,255              Dated    May 11, 1976

Inventor(s) Morris R. Ort

It is certified that error appears in the above-identified patent and that said Letters Patent are hereby corrected as shown below:

Column 1, line 47, should read ".... produced. Control....."

Column 1, line 53, for "U. S. Patent No. 3,501,690" read "U. S. Patent No. 3,051,690."

Column 3 and 4, lines 13 - 27, Table 1, the extra heading "Silica Modifier" located in the upper left corner should be deleted.

Column 9, line 9, for "which" read "within."

Column 9, Claim 1, line 31 after "(1)", the words "compounds of the formula" should be inserted.

Column 10, line 31, for "ith" read "with"

Signed and Sealed this

Twenty-sixth Day of April 1977

[SEAL]

Attest:

RUTH C. MASON
Attesting Officer

C. MARSHALL DANN
Commissioner of Patents and Trademarks